US009569735B1

(12) United States Patent
Zhu et al.

(10) Patent No.: US 9,569,735 B1
(45) Date of Patent: Feb. 14, 2017

(54) MEMBER COMMUNICATION REPLY SCORE CALCULATION

(71) Applicant: LinkedIn Corporation, Mountain View, CA (US)

(72) Inventors: Qiang Zhu, Sunnyvale, CA (US); Keqing Liang, Sunnyvale, CA (US); Peter Hume Rigano, San Francisco, CA (US); Matthew Steven Tague, San Mateo, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 0 days.

(21) Appl. No.: 14/975,756

(22) Filed: Dec. 19, 2015

(51) Int. Cl.
*G06N 99/00* (2010.01)
*H04L 29/08* (2006.01)
*H04L 12/58* (2006.01)
*G06F 17/30* (2006.01)
*G06N 7/00* (2006.01)

(52) U.S. Cl.
CPC ......... *G06N 99/005* (2013.01); *G06F 17/3053* (2013.01); *G06N 7/005* (2013.01); *H04L 51/04* (2013.01); *H04L 67/02* (2013.01); *H04L 67/22* (2013.01); *H04L 67/306* (2013.01)

(58) Field of Classification Search
CPC ... G06N 99/005; G06N 7/005; G06F 17/3053; H04L 51/04; H04L 67/02; H04L 67/22; H04L 67/306
USPC .......................................................... 706/11
See application file for complete search history.

(56) References Cited

U.S. PATENT DOCUMENTS

| | | | |
|---|---|---|---|
| 2011/0184958 A1* | 7/2011 | Krishnamoorthy .... | G06Q 30/02 707/749 |
| 2014/0214960 A1* | 7/2014 | Allen ...................... | H04L 67/22 709/204 |
| 2014/0280236 A1* | 9/2014 | Faller .................. | G06F 17/3053 707/749 |
| 2015/0006295 A1* | 1/2015 | Liu .................... | G06Q 30/0269 705/14.66 |
| 2015/0006442 A1* | 1/2015 | Ogilvie .................. | G06Q 50/01 706/12 |
| 2015/0046553 A1* | 2/2015 | DeBenedictis ......... | H04L 51/04 709/206 |

* cited by examiner

*Primary Examiner* — Stanley K Hill
*Assistant Examiner* — Dave Misir
(74) *Attorney, Agent, or Firm* — Schwegman Lundberg & Woessner, P.A.

(57) ABSTRACT

In an example embodiment, a supervised machine learning algorithm is used to train a communication reply score model based on an extracted first set of features and second set of features from social networking service member profiles and activity and usage information. When a plurality of member search results is to be displayed, for the member identified in each of the plurality of member search results, the member profile corresponding to the member is parsed to extract a third set of one or more features from the member profile, activity and usage information pertaining to actions taken by the members on the social networking service is parsed to extract a fourth set of one or more features, and the extracted third set of features and fourth set of features is inputted into the communication reply score model to generate a communication reply score, which is displayed visually to a searcher.

20 Claims, 10 Drawing Sheets

MEMBER COMMUNICATION REPLY SCORE CALCULATION

TECHNICAL FIELD

The present disclosure generally relates to computer technology for solving technical challenges in electronic communications. More specifically, the present disclosure relates to the calculation of a communication reply score for members of an online network.

BACKGROUND

The rise of the Internet has given rise to two disparate phenomena: the increase in the presence of social networks, with their corresponding member profiles visible to large numbers of people, and the increase in the desirability of reaching out to small groups of social network members who meet strict criteria. This is especially pronounced in the field of recruiting, where recruiters are typically attempting to find members with particular qualifications (e.g., education, experience, skills, etc.) and then generally the recruiters reach out to members with the particular qualifications to find out whether or not the members may be willing to apply for the job openings the recruiter has available.

Job solicitation communications, such as emails sent by recruiters to members who may be prospective job applicants, can take a lot of time on the part of the recruiters, especially if done effectively. Effective job solicitation communications generally include personalized information about the member and have the solicitation geared specifically towards that member, thus making it look less like a mass communication sent to many potential applications and more like the recruiter has specifically targeted the member. Recruiters, however, have a limited amount of time to spend in creating such job solicitation communications, and thus would benefit greatly if presented with insights as to how likely a particular member is to respond to such a job solicitation communication. A technical problem arises, however, in determining whether a particular member, gauged from information available to a computer system, is likely to respond to a particular communication.

Another technical problem that arises is that, even if a recruiter were presented with information about the chances that a particular member will reply to a job solicitation email, unless this information is presented visually in an effective way via a user interface, the information may not be utilized correctly.

BRIEF DESCRIPTION OF THE DRAWINGS

Some embodiments of the technology are illustrated, by way of example and not limitation, in the figures of the accompanying drawings.

FIG. 6 is a screen capture illustrating a user interface, in accordance with another example embodiment.

FIG. 7 is a screen capture illustrating a user interface, in accordance with another example embodiment.

DETAILED DESCRIPTION

Overview

The present disclosure describes, among other things, methods, systems, and computer program products that individually provide functionality for speeding data access. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a platform is provided that utilizes information available to a computer system to evaluate a likelihood that a particular social network member will respond to a particular communication. In another example embodiment, a specific user interface is provided to present this likelihood to a recruiter or other interested party in a manner that is effective in quickly conveying the likelihood of the member and other members replying to a communication.

It should be noted that the term "social" as used throughout this document should be interpreted broadly to cover any type of grouping of online members of a service in which communications can be sent through the service. This is in contrast to a grouping of online members of services where communications are only sent through external means (e.g., traditional email, phone call, etc.), and also in contrast to groupings of general Internet users.

Figure 1:
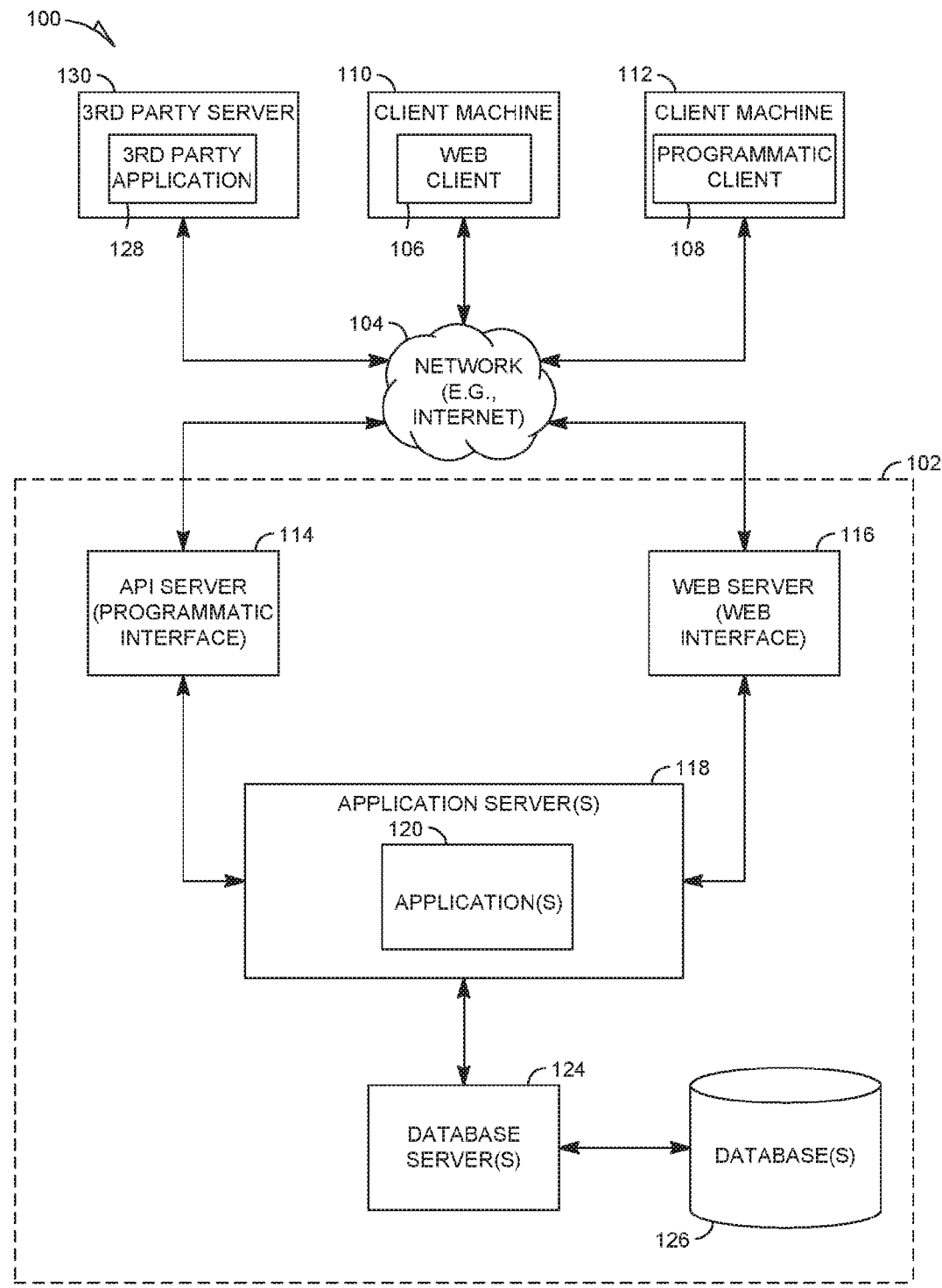
FIG. 1 is a block diagram illustrating a client-server system, in accordance with an example embodiment.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third party application 128, executing on a third party server 130, as having programmatic access to the networked system 102 via the programmatic interface provided by the API server 114. For example, the third party application 128 may, utilizing information retrieved from the networked system 102, support one or more features or functions on a website hosted by a third party. The third party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the machines 110, 112 and the third party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
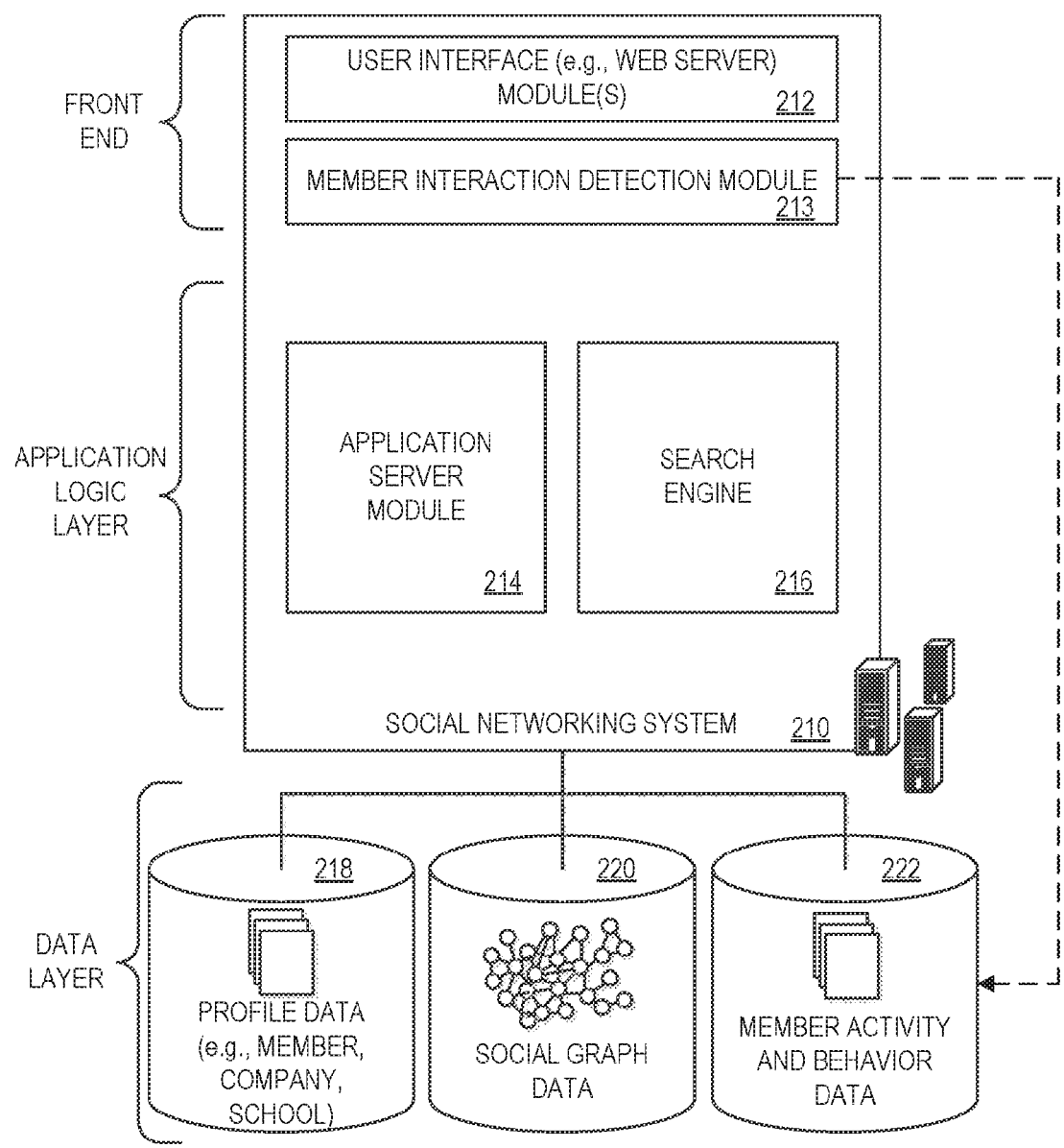
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices, and communicates appropriate responses to the requesting client devices. For example, the user interface module(s) 212 may receive requests in the form of Hypertext Transfer Protocol (HTTP) requests or other web-based API requests. In addition, a member interaction detection module 213 may be provided to detect various interactions that members have with different applications 120, services, and content presented. As shown in FIG. 2, upon detecting a particular interaction, the member interaction detection module 213 logs the interaction, including the type of interaction and any metadata relating to the interaction, in a member activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases, such as a profile database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Once registered, a member may invite other members, or be invited by other members, to connect via the social networking service. A "connection" may constitute a bilateral agreement by the members, such that both members acknowledge the establishment of the connection. Similarly, in some embodiments, a member may elect to "follow" another member. In contrast to establishing a connection, the concept of "following" another member typically is a unilateral operation and, at least in some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph in a social graph database 220.

As members interact with the various applications 120, services, and content made available via the social networking service, the members' interactions and behavior (e.g., content viewed, links or buttons selected, messages responded to, etc.) may be tracked, and information concerning the members' activities and behavior may be logged or stored, for example, as indicated in FIG. 2, by the member activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking service system 210 provides an API module via which applications 120 and services can access various data and services provided or maintained by the social networking service. For example, using an API, an application may be able to request and/or receive one or more navigation recommendations. Such applications 120 may be browser-based applications 120, or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when member profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and member activity and behavior data (stored, e.g., in the member activity and behavior database 222). The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Figure 3:
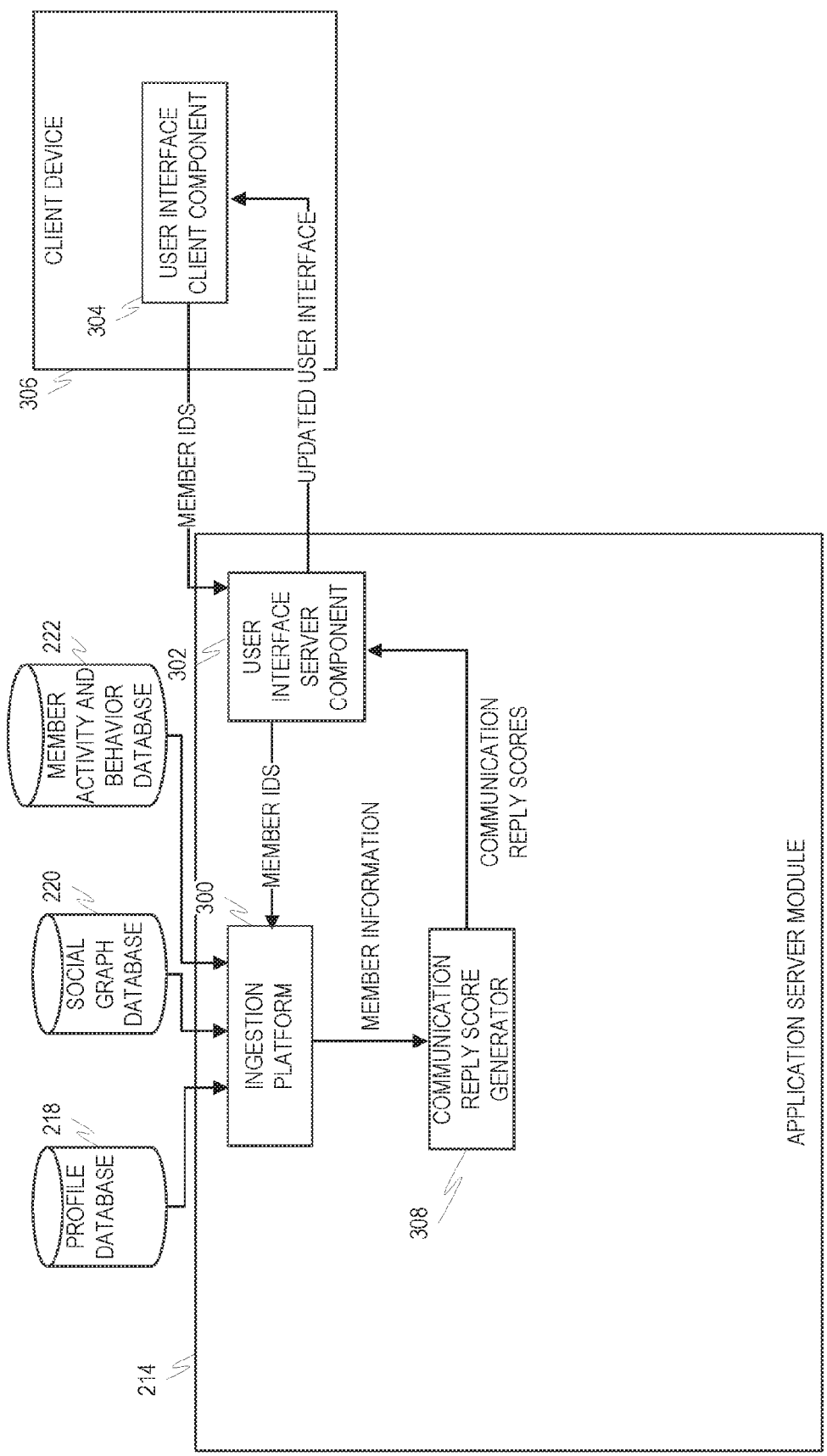
FIG. 3 is a block diagram illustrating an application server module of FIG. 2 in more detail.

FIG. 3 is a block diagram illustrating an application server module 214 of FIG. 2 in more detail. While in many embodiments the application server module 214 will contain many subcomponents used to perform various different actions within the social networking system, in FIG. 3 only those components that are relevant to the present disclosure are depicted. Here, an ingestion platform 300 obtains information from the profile database 218, the social graph database 220, and the member activity and behavior database 222 relevant to a member and/or searcher identified by a user interface server component 302. The user interface server component 302 communicates with a user interface client component 304 located on a client device 306 to obtain this identification information. The details of the user interface client component 304 will be described in more detail below, but generally a user, known hereafter as a searcher, of the user interface client component 304 may perform a search or otherwise generate a search that provides search results of members of the social networking service with whom the searcher may wish to communicate. Information about each of these members identified in the search results may then be communicated via the user interface server component 302 to the ingestion platform 300, which can use the identifications to retrieve the appropriate information corresponding to those members from the profile database 218, the social graph database 220, and the member activity and behavior database 222. As will be discussed in more detail below, in some example embodiments, information about the searcher, such as a recruiter, may also be relevant to a communication reply score calculation also described later. As such, an identification of the searcher may also be communicated via the user interface server component 302 to the ingestion platform 300, which can use the identifications to retrieve the appropriate information corresponding to the searcher from the profile database 218, the social graph database 220, and the member activity and behavior database 222.

The ingestion platform 300 may then provide the relevant information from the profile database 218, the social graph database 220, and the member activity and behavior database 222 to a communication reply score generator 308, which acts to calculate a communication reply score for each identified member. In embodiments where the identification of the searcher is relevant to this score generation, the communication reply score may be thought of as being for each identified member/identified searcher pair, and thus a different communication reply score may be assigned to the same member if a different searcher is involved.

The calculated communication reply score may then be passed from the communication reply score generator 308 to the user interface server component 302, which acts to cause the user interface client component 304 to display an indication to the user/searcher of the score for each relevant member with which the user/search the user/searcher is presented. The form that this indication will take will be described in more detail below.

Figure 4:
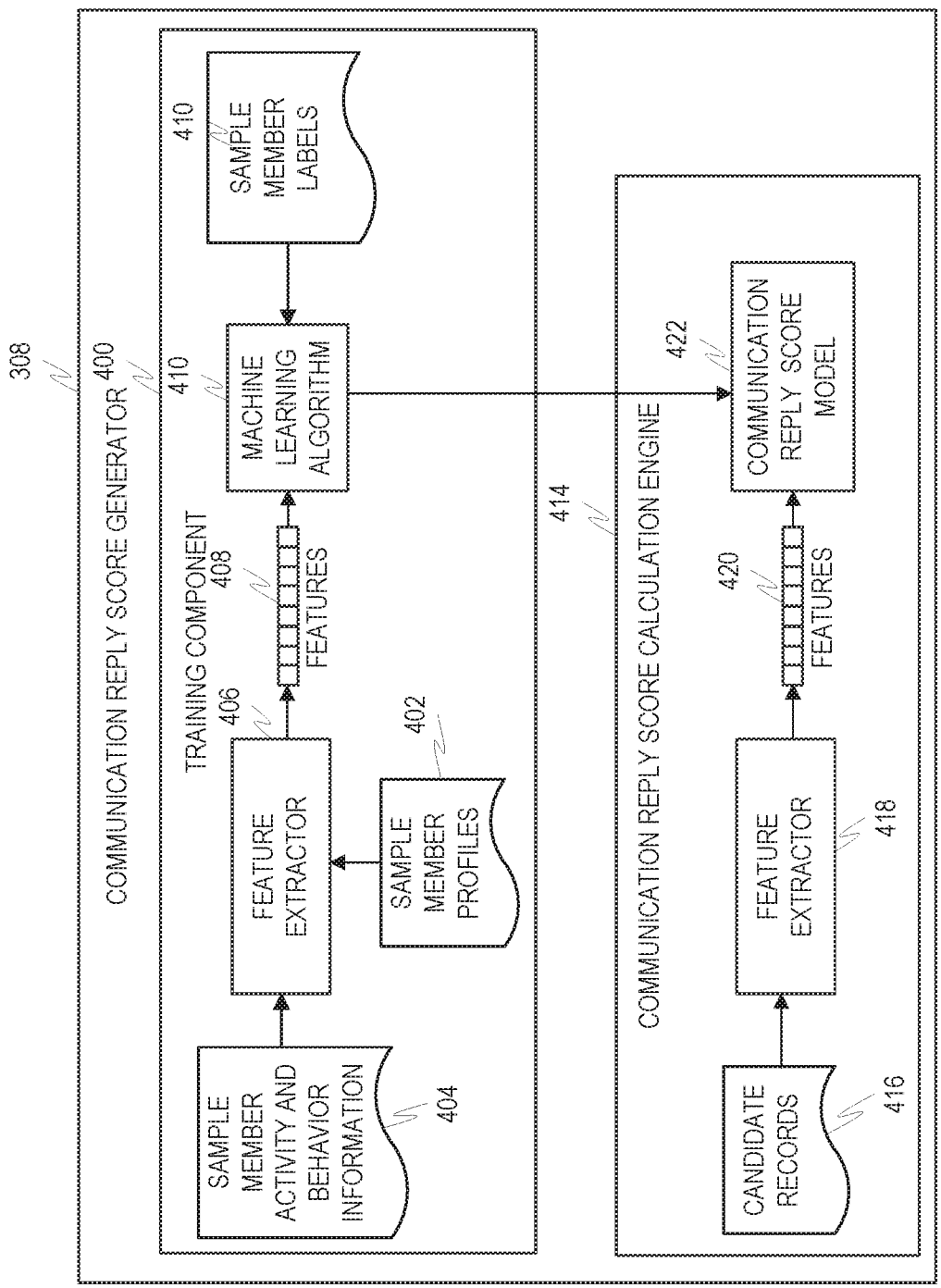
FIG. 4 is a block diagram illustrating the communication reply score generator of FIG. 3 in more detail, in accordance with an example embodiment.

FIG. 4 is a block diagram illustrating the communication reply score generator 308 of FIG. 3 in more detail, in accordance with an example embodiment. In a training component 400, sample member profiles 402 and sample member activity and behavior information 404 are fed to a feature extractor 406, which acts to extract curated features 408 from the sample member profiles 402 and sample member activity and behavior information 404. Different features may be extracted depending upon whether the member profile is assumed to be that of a prospective search result or that of a prospective searcher.

In an example embodiment, the curated features 408 are then used to train a supervised machine learning algorithm 410 to calculate a confidence score that indicates the confidence that the targeted member replied to the searcher. This training may include providing sample member labels 412 to the machine learning algorithm 410. Each label is a binary variable which indicates, in a case where a searcher sent an email to a candidate, whether the candidate replied or not.

In a communication reply score calculation engine 414, candidate records 416 are fed to a feature extractor 418, which acts to extract curated features 420 from the candidate records 416. The candidate records 416 include member profile information and member activity and behavior information extracted by the ingestion platform 300, which can use the identifications from the user interface server component 302 to retrieve the appropriate information corresponding to those members from the profile database 218, the social graph database 220, and the member activity and behavior database 222. The curated features 420 are then used as input to a communication reply score model 422, which acts to provide communication reply scores for member identified by the user interface server component 302.

It should be noted that while the feature extractor 406 and the feature extractor 418 are depicted as separate components, in some example embodiments they may be the same component. Additionally, a large number of different types of features could be extracted using the feature extractors 406 and 418.

In an example embodiment, features extracted by the feature extractor 406 and/or feature extractor 418 include, but are not limited to:
1) Total page views by the member during sessions on the social network
2) Inbox page views by the member during sessions on the social network
3) News feed impressions by the member during sessions on the social network
4) Number of address book uploads by the member during sessions on the social network
5) Ad impressions The various metrics may also be gathered and weighted based on how recent the data is. For example, total page views by a member may not include all member page views for all time, but may be limited to only member page views within the last month (indicating recent activity by the member), and may be weighted such that member page views within the last week have the most impact on the score (indicating even more recent activity by the member).

The communication reply score model 422 may be trained specifically for the type of communication reply desired. For example, as described above, one example use case involves recruiters wanting to know the likelihood that a prospective job candidate will respond to an email communication sent from the recruiter via the social networking service. Thus, in this case, the communication reply score model 422 may be trained based on features relevant to whether a member will be likely to respond to a job solicitation communication. On the other hand, if the communication reply score model 422 is used in a different use case, such as where a salesperson wants to know the likelihood that a prospective sales lead will respond to an email communication sent by the salesperson via the social networking system, the communication reply score model 422 may be trained using different features relevant to whether a member will be likely to respond to a sales solicitation communication.

As described briefly above, in an example embodiment, a user interface is provided that aids the searcher in efficiently discovering whether or not members are likely to respond to a communication. The user interface may include a user interface server component 302 and a user interface client component 304. Distribution of functions between the user interface server component 302 and the user interface client component 304 can vary based on the implementation of the user interface. In an example embodiment, the user interface includes a service running in a web browser, and thus the user interface server component 302 may be thought of as a web server while the user interface client component 304 may comprise a web page (or a series of web pages) distributed by the web server. The web page may include elements that, when selected, cause information to be passed to the user interface server component 302, which may then generate an updated web page to be displayed by the web browser. In this way, for example, searches may be performed by a searcher selecting one or more elements of the web page (or providing other input in the web page), which is then passed to the user interface server component 302 which, after obtaining results responsive to the search, adds an indication of the communication reply score for each member in the results and generates a web page with the results and score indications for display in the user interface client component 304. In another example embodiment, the user interface client component 304 may include a plug-in to a web browser.

In an example embodiment, results responsive to a search by a searcher are presented in the same way they ordinarily would be; namely, they may be presented based on an algorithm that ranks the search results based on various factors. Rather than reorder the results based on, for example, communication reply score, in an example embodiment, the existing ranking of the search results is maintained while an indication is provided next to each search result providing the searcher with information as to the communication reply score for the corresponding member.

Figure 5:
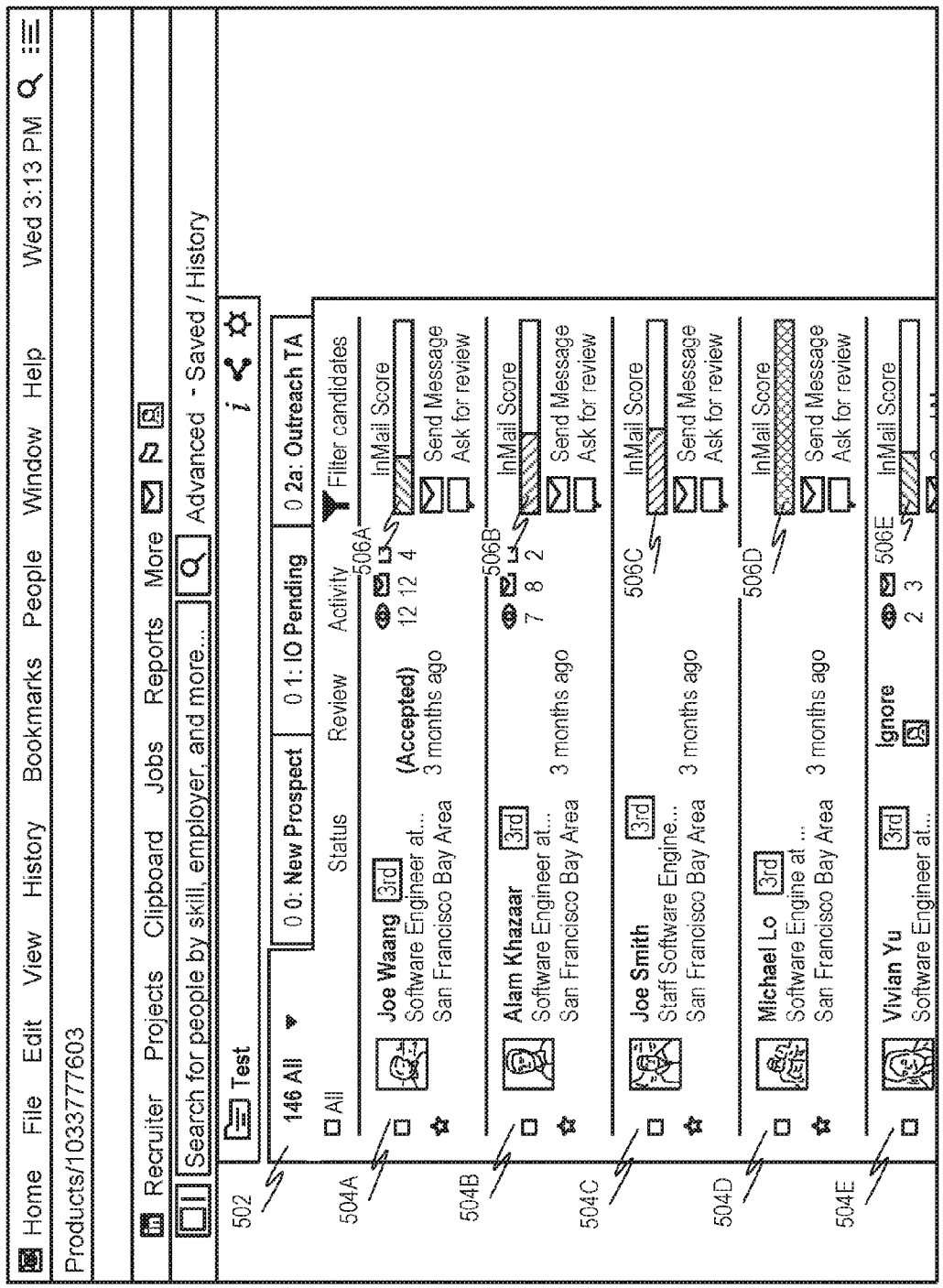
FIG. 5 is a screen capture illustrating an example user interface, in accordance with an example embodiment.

FIG. 5 is a screen capture illustrating an example user interface 500, in accordance with an example embodiment. Here, the user interface presents search results in window 502. It should be noted that while these results are called search results, in some cases the results are not produced in response to a specific search provided by a searcher but are produced in response to "browsing" by the searcher —namely where the searcher navigates groupings of member profiles by category or even is presented with random member results. In FIG. 5, no specific search query is provided by the searcher, and yet a series of member search results 504A-504E are presented as results. As discussed above, the user interface client component 304 does not reorder these member search results 504A-504E based on communication reply score, but rather provides indicators 506A-506E of the general range in which the communication reply score lies.

Here, the general ranges are divided into three groups 'high likelihood," "moderate likelihood," and "low likelihood" of responding to an electronic communication from the searcher. These groupings are defined based on a comparison to historical communication reply scores calculated for members. Specifically, an average communication reply score across many members may be calculated. Scores within a particular range of this average communication reply score may be placed in the "moderate likelihood' group, with scores above this range being placed in the "high likelihood" group and scores below this range placed in the "low likelihood group." In an example embodiment, the range for the "moderate likelihood group" includes only those scores at or within a particular range above the average communication reply score.

Thus, the grouping of a particular score is based on the relative relationship between the score and the average score, as opposed to, for example, based on an absolute range (e.g., scores above a certain preset level corresponding to a particular group).

In an alternative embodiment, the score groups are defined based on the historical communication response label data and their corresponding communication reply scores. For example, it may be noted that in historical data, when the communication reply score is greater than 0.3, the response rate is twice as high than the average response rate, and thus may be defined as a "high likelihood" group, while for a communication reply score less than 0.2, the response rate is lower than the average response rate, and thus may be defined as a "low likelihood" group. The group for scores between 0.2 and 0.3 may then be defined as a "moderate likelihood" group. Note that the score range can varies by different application, and also may change over time.

The indicators 506A-506E include two parts, a color and a bar chart element. The color is a color chosen to represent the grouping corresponding to the particular score. For example, red may represent the "low likelihood group," yellow the "moderate likelihood group," and green the "high likelihood" group. Likewise, the bar chart also represents the grouping corresponding to the particular score. For example, "low likelihood" may be represented by a bar chart where the bar is only ¼ of the way filled in, "moderate likelihood" may be represented by a bar chart where the bar is slightly over ½ of the way filled in, and "high likelihood" may be represented by a bar chart where the bar is entirely filled in. This is in contrast, for example, to having the bar represent the absolute communications reply score. The reason for this is that it is not uncommon for an absolute communications reply score to be assigned that is less than what a searcher might incorrectly perceive as a "low" score, and yet that score may still be relatively high. For example, if the score represents the probability (between 0 and 1) that the member will respond to an electronic communication, then the searcher may perceive that something above 0.8 may be necessary in order for that score to be deemed high, yet in reality given the low percentage of electronic solicitations of any type that receive responses, a probability of 0.5 might actually be a fantastic score. If the bar chart were to represent the 0.5 probability in absolute terms, the bar would only be half filled in, giving an incorrect impression to the searcher.

Figure 6:
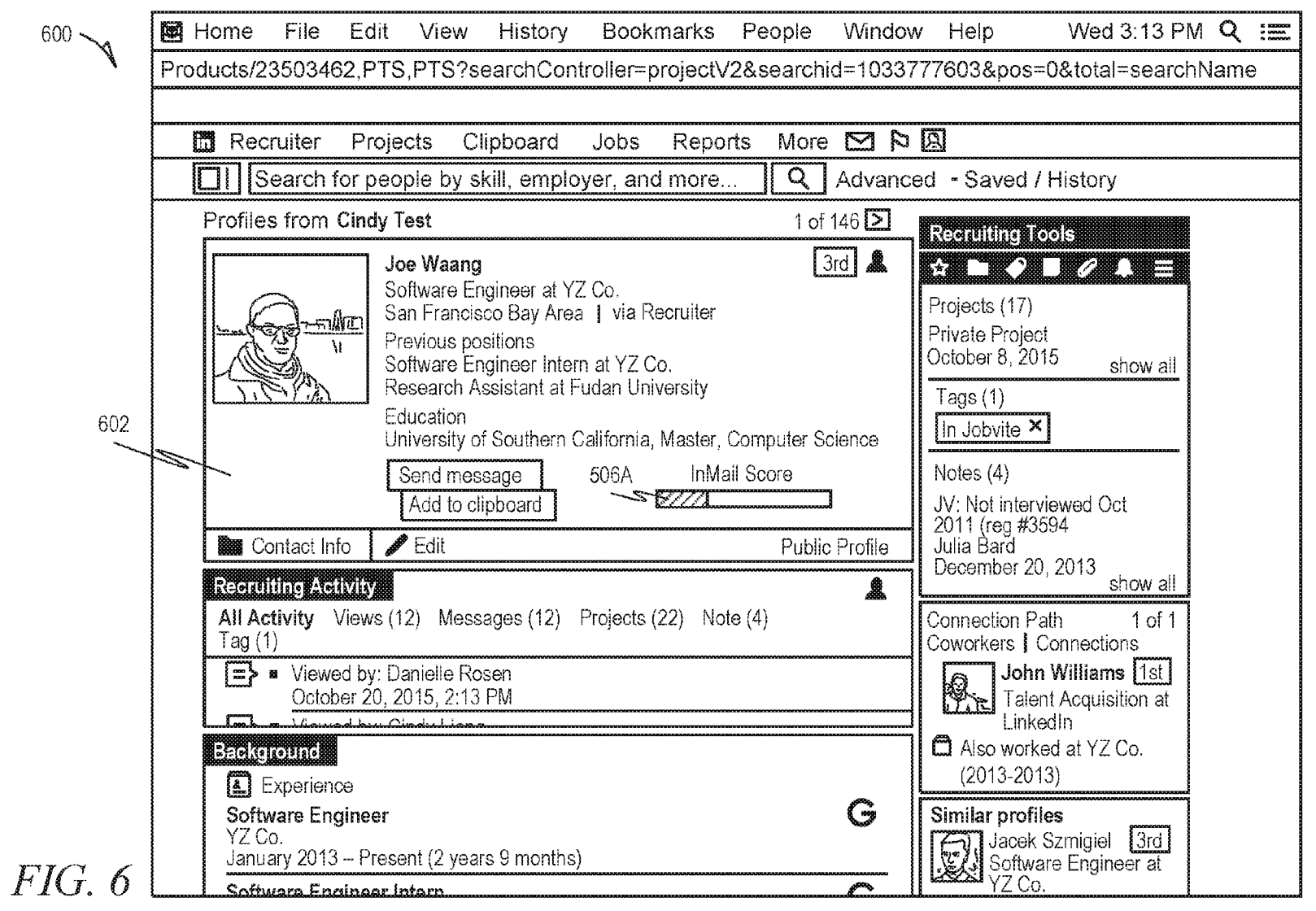

The indications may continue to appear as the searcher drills down on search results. FIG. 6 is a screen capture illustrating a user interface 600, in accordance with another example embodiment. Here, the searcher has selected member search result 504A of FIG. 5, resulting in that member's profile 602 being displayed. Notably, the member's indicator 506A is also displayed in this profile 602.

Figure 7:
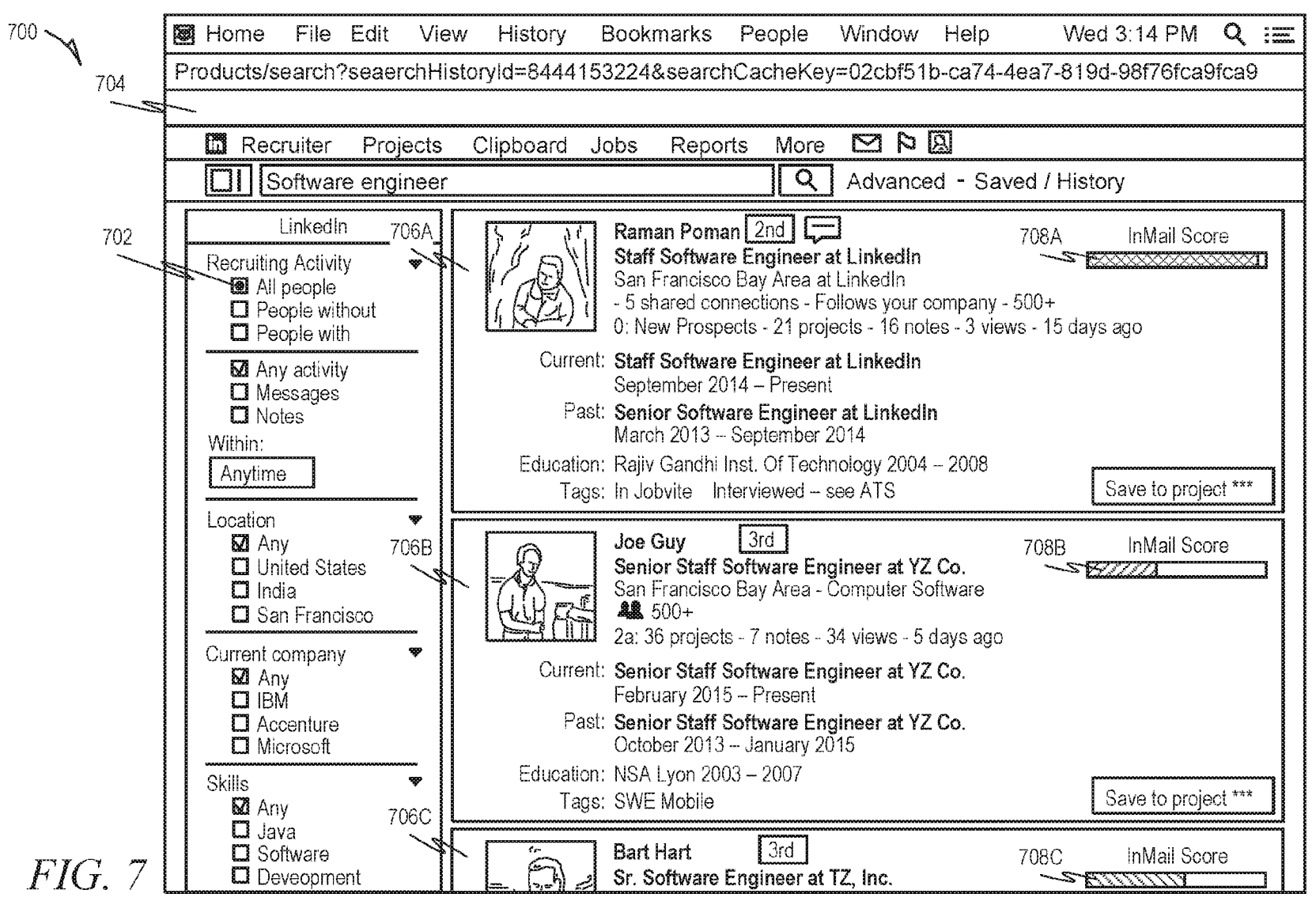

FIG. 7 is a screen capture illustrating a user interface 700, in accordance with another example embodiment. Here, the searcher has performed a specific search query for members matching certain criteria (specified by filters 702 and by a search query 704). The member search results 706A-706C therefore reflect members matching the filters 702 and search query 704, and are presented in an order that is defined by a search algorithm, and not based on the communication reply score for the members corresponding to the member search results 706A-706C. Thus, for example, member search result 706B is presented above member search result 706C, despite the fact that indication 708B and indication 708C indicate that the member corresponding to member search result 706B has a lower communication reply score than the member corresponding to member search result 706C.

In another example embodiment, the application server module 214 may automatically periodically refresh the communication reply scores. For example, a searcher may be able to "favorite" particular members who fit a particular criteria but for one reason or another have lower communication reply scores. The system may then periodically refresh those members' communication reply scores and notify the searcher if a member's communication reply score significantly changes. Thus, in the case where a particular member had no interest in receiving job solicitations but something changes and that member suddenly has interest in receiving job solicitations (e.g., being turned down for a promotion), the updated communication reply score may be used to alert the searcher that the member may now be a good candidate to send a communication to, even though they were not before.

As described above, the instant disclosure may be expanded beyond the use case involving recruiters looking for job applicants to other user cases where a searcher wants to know the probability that a communication will garner a response from one of the members corresponding to a search result. One additional such use case is in the realm of dating web sites. In such web sites, the social networking service described above may be thought of as the dating service. The communication reply score model 402 may be trained based on features that are relevant to whether a potential dating match would be likely to respond to an electronic communication from the searcher. This may be useful for searchers concerned with saving time or improving efficiency by not needing to create communications to low-probability responders, but also can be useful for those members of the dating pool who are shy, have social anxiety issues, or otherwise may be very reluctant to send communications for fear of "rejection" (even though the rejection may be passive, in that the recipient may simply not respond).

Figure 8:
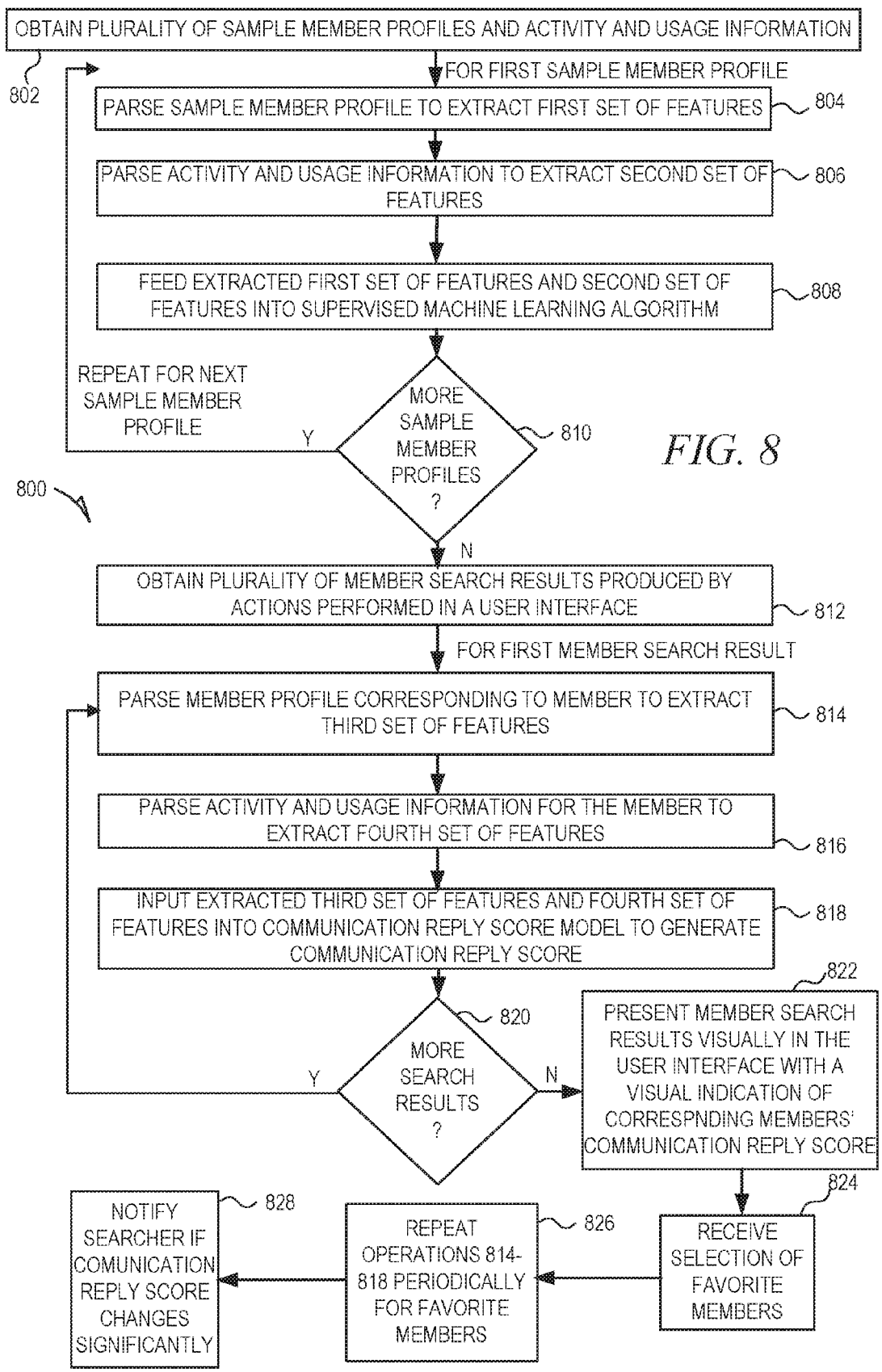
FIG. 8 is a flow diagram illustrating a method, in accordance with an example embodiment, for providing an indication of a probability that a member of a social networking service will respond to an electronic communication sent via the social networking service.

FIG. 8 is a flow diagram illustrating a method 800, in accordance with an example embodiment, for providing an indication of a probability that a member of a social networking service will respond to an electronic communication sent via the social networking service. At operation 802, a plurality of sample member profiles and response labels of members of the social networking service, and activity and usage information pertaining to actions taken by those members on the social networking service, are retrieved. Then a loop is begun for each sample member profile. At operation 804, the sample member profile is parsed to extract a first set of one or more features from the sample member profile. At operation 806, the activity and usage information pertaining to actions taken by the member on the social networking service are parsed to extract a second set of one or more features. At operation 808, the extracted first set of features and second set of features are fed into a supervised machine learning algorithm to train a communication reply score model based on the response labels, the extracted first set of features and the second set of features. At operation 810, it is determined if there are any more sample member profiles. If so, then the process loops back to operation 804.

If not, then at operation 812, a plurality of member search results produced by actions performed in a user interface is obtained, with each member search result identifying a member of the social networking service. In some example embodiments these results include an ordering based on a ranking of each member search result based on a search engine. Then a loop is begun for the member identified in each of the plurality of member search results. At operation 814, a member profile corresponding to the member is parsed to extract a third set of one or more features from the member profile. At operation 816, activity and usage information pertaining to actions taken by the members on the social networking service is parsed to extract a fourth set of one or more features. In some example embodiments, the first set of features is identical to the third set of features and the second set of features is identical to the fourth set of features. At operation 818, the extracted third set of features and fourth set of features are inputted into the communication reply score model to generate a communication reply score reflecting a probability that the member will respond to an email communication from the searcher. At operation 820, it is determined if this is the last member search result. If not, then the process loops back to operation 814.

If so, then at operation 822, the member search results are presented visually in the user interface, with each member search result being presented with a visual indication of the corresponding members' communication reply score. In some example embodiments, the ordering obtained with the search results is maintained in the presentation in operation 822, regardless of the communication reply scores of the corresponding members.

At operation 824, a selection of one or more members is received from the user interface as favorites. At operation 826, operations 814-818 are periodically repeated for the corresponding member. At operation 828, the searcher is notified if a communication reply score for the corresponding member changes significantly. In an example embodiment, the communication reply score is deemed to have changed significantly if the change causes the score to fall within a different grouping. In another example embodiment, the communication reply score is deemed to have changed significantly if the change is greater than a preset score differential. In another example embodiment, the communication reply score is deemed to have changed significantly if the change is greater than a preset percentage.

It should be noted that in an alternative example embodiment, rather than perform the scoring just on the members that are included as search or browse results of a searcher, scoring is performed on all members on a periodic basis (e.g., weekly). This allows for faster processing of searches as scores will not need to be computed on-the-fly when a search is performed.

In embodiments where the supervised machine learning algorithm takes into account information about the searcher in its score calculation, there may be additional steps involved in retrieving a plurality of sample searcher member profiles of members of the social networking service, and activity and usage information pertaining to actions taken by those searchers on the social networking service, for each sample searcher member profile: parsing the sample searcher member profile to extract a fifth set of one or more features from the sample searcher member profile and parsing the activity and usage information pertaining to actions taken by those searchers on the social networking service to extract a sixth set of one or more features, and feeding the extracted fifth set of features and sixth set of features into a supervised machine learning algorithm to train a communication reply score model based on the extracted fifth set of features and the sixth set of features. Furthermore, once the communication reply score model is trained, there may be additional steps involved in obtaining an identification of the searcher from the user interface, parsing a member profile corresponding to the searcher to extract a seventh set of one or more features from the member profile and parsing activity and usage information pertaining to actions taken by the searcher on the social networking service to extract an eighth set of one or more features; and inputting the extracted seventh set of features and eight set of features into the communication reply score model to generate the communication reply score reflecting a probability that the member will respond to an email communication from the searcher.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-8 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 9:
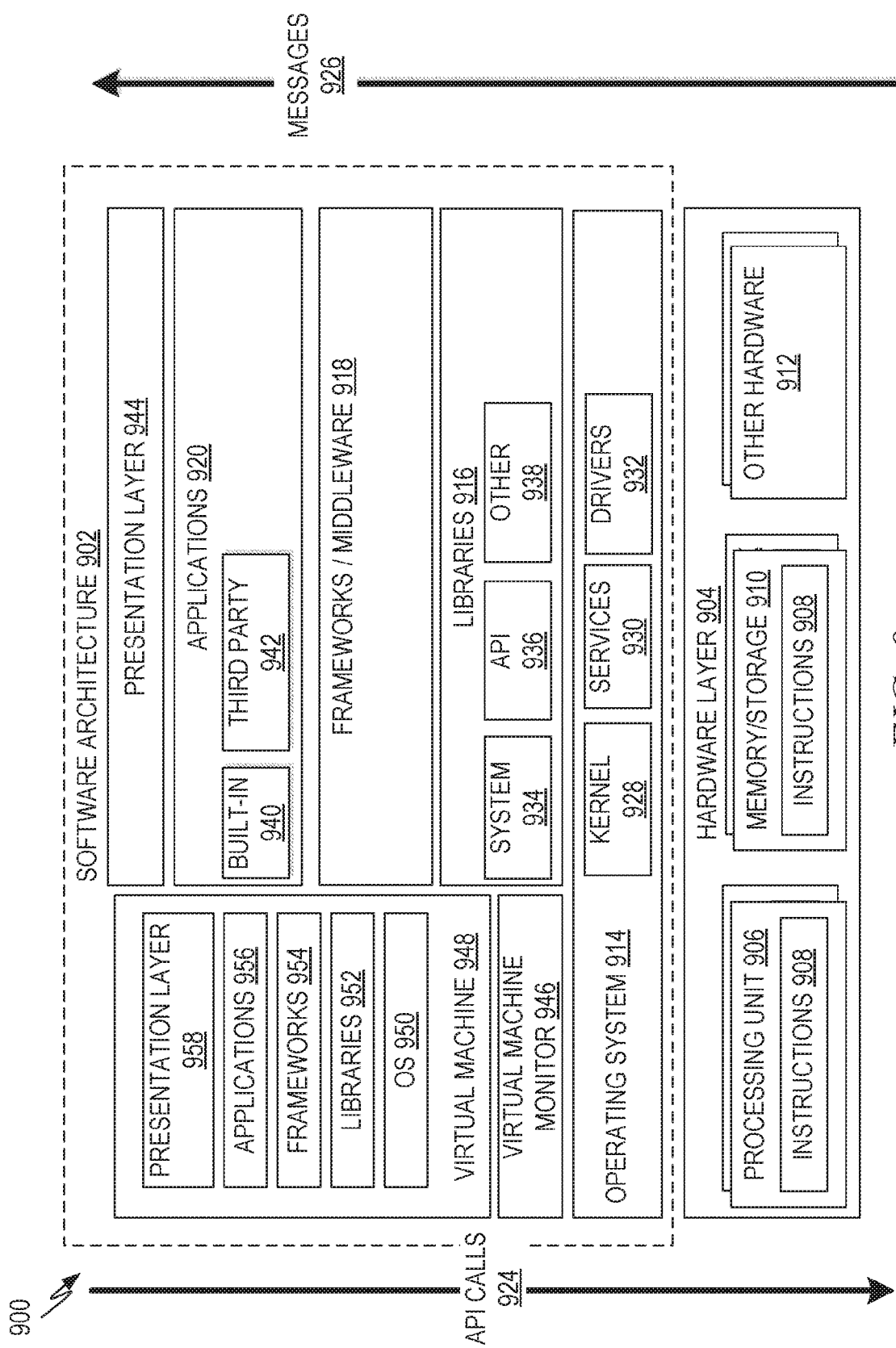
FIG. 9 is a block diagram illustrating a representative software architecture, which may be used in conjunction with various hardware architectures herein described.

FIG. 9 is a block diagram 900 illustrating a representative software architecture 902, which may be used in conjunction with various hardware architectures herein described. FIG. 9 is merely a non-limiting example of a software architecture, and it will be appreciated that many other architectures may be implemented to facilitate the functionality described herein. The software architecture 902 may be executing on hardware such as a machine 1000 of FIG. 10 that includes, among other things, processors 1010, memory/storage 1030, and I/O components 1050. A representative hardware layer 904 is illustrated and can represent, for example, the machine 1000 of FIG. 10. The representative hardware layer 904 comprises one or more processing units 906 having associated executable instructions 908. The executable instructions 908 represent the executable instructions of the software architecture 902, including implementation of the methods, modules, and so forth of FIGS. 1-8. The hardware layer 904 also includes memory and/or storage modules 910, which also have the executable instructions 908. The hardware layer 904 may also comprise other hardware 912, which represents any other hardware of the hardware layer 904, such as the other hardware illustrated as part of the machine 1000.

In the example architecture of FIG. 9, the software architecture 902 may be conceptualized as a stack of layers where each layer provides particular functionality. For example, the software architecture 902 may include layers such as an operating system 914, libraries 916, frameworks/middleware 918, applications 920, and a presentation layer 944. Operationally, the applications 920 and/or other components within the layers may invoke API calls 924 through the software stack and receive responses, returned values, and so forth, illustrated as messages 926, in response to the API calls 924. The layers illustrated are representative in nature and not all software architectures have all layers. For example, some mobile or special purpose operating systems may not provide a layer of frameworks/middleware 918, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 916 may provide a common infrastructure that may be utilized by the applications 920 and/or other components and/or layers. The libraries 916 typically provide functionality that allows other software modules to perform tasks in an easier fashion than by interfacing directly with the underlying operating system 914 functionality (e.g., kernel 928, services 930, and/or drivers 932). The libraries 916 may include system 934 libraries (e.g., C standard library) that may provide functions such as memory allocation functions, string manipulation functions, mathematic functions, and the like. In addition, the libraries 916 may include API 936 libraries such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks 918 (also sometimes referred to as middleware) may provide a higher-level common infrastructure that may be utilized by the applications 920 and/or other software components/modules. For example, the frameworks 918 may provide various graphic user interface (GUI) functions, high-level resource management, high-level location services, and so forth. The frameworks 918 may provide a broad spectrum of other APIs that may be utilized by the applications 920 and/or other software components/modules, some of which may be specific to a particular operating system or platform.

The applications 920 include built-in applications 940 and/or third party applications 942. Examples of representative built-in applications 940 may include, but are not limited to, a contacts application, a browser application, a book reader application, a location application, a media application, a messaging application, and/or a game application. The third party applications 942 may include any of the built-in applications as well as a broad assortment of other applications. In a specific example, the third party application 942 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 942 may invoke the API calls 924 provided by the mobile operating system such as the operating system 914 to facilitate functionality described herein.

The applications 920 may utilize built-in operating system 914 functions (e.g., kernel 928, services 930, and/or drivers 932), libraries 916 (e.g., system 934, APIs 936, and other libraries 938), and frameworks/middleware 918 to create user interfaces to interact with users of the system. Alternatively, or additionally, in some systems, interactions with a user may occur through a presentation layer, such as the presentation layer 944. In these systems, the application/module "logic" can be separated from the aspects of the application/module that interact with a user.

Some software architectures utilize virtual machines. In the example of FIG. 9, this is illustrated by a virtual machine 948. A virtual machine creates a software environment where applications/modules can execute as if they were executing on a hardware machine (such as the machine 1000 of FIG. 10, for example). A virtual machine is hosted by a host operating system (e.g., operating system 914 in FIG. 9) and typically, although not always, has a virtual machine monitor 946, which manages the operation of the virtual machine as well as the interface with the host operating system (e.g., operating system 914). A software architecture executes within the virtual machine 948, such as an operating system 950, libraries 952, frameworks/middleware 954, applications 956, and/or a presentation layer 958. These layers of software architecture executing within the virtual machine 948 can be the same as corresponding layers previously described or may be different.

Example Machine Architecture and Machine-Readable Medium

Figure 10:
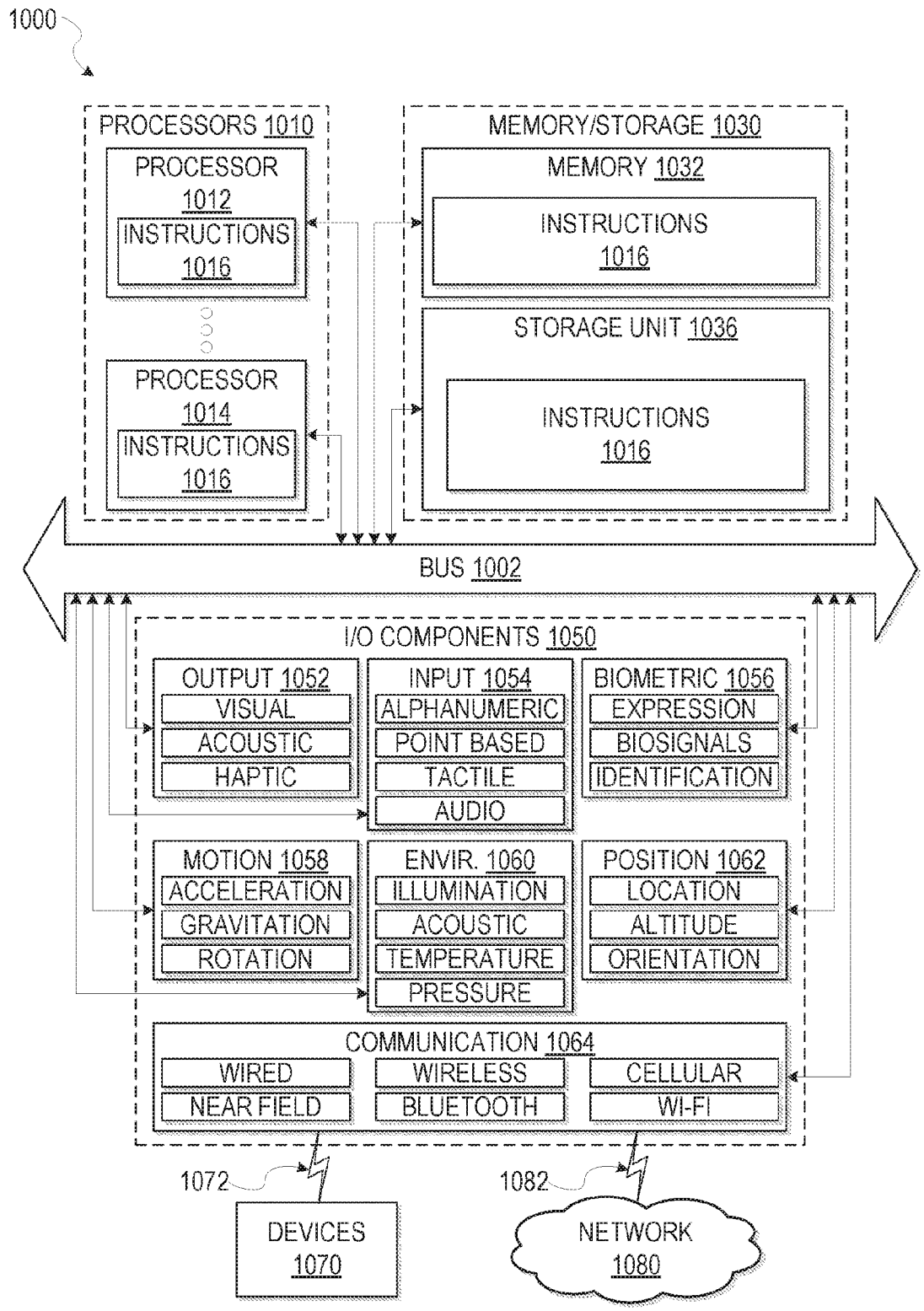
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. The instructions transform the general, non-programmed machine into a particular machine programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory/storage 1030, and I/O components 1050, which may be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1012 and a processor 1014 that may execute the instructions 1016. The term "processor" is intended to include multi-core processors that may comprise two or more independent processors (sometimes referred to as "cores") that may execute instructions contemporaneously. Although FIG. 10 shows multiple processors 1010, the machine 1000 may include a single processor with a single core, a single processor with multiple cores (e.g., a multi-core processor), multiple processors with a single core, multiple processors with multiples cores, or any combination thereof.

The memory/storage 1030 may include a memory 1032, such as a main memory, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 may also reside, completely or partially, within the memory 1032, within the storage unit 1036, within at least one of the processors 1010 (e.g., within the processor's cache memory), or any suitable combination thereof, during execution thereof by the machine 1000. Accordingly, the memory 1032, the storage unit 1036, and the memory of the processors 1010 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine (e.g., processors 1010), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1062 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or other suitable device to interface with the network 1080. In further examples, the communication components 1064 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a USB).

Moreover, the communication components 1064 may detect identifiers or include components operable to detect identifiers. For example, the communication components 1064 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1080 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., HTTP). Similarly, the instructions 1016 may be transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method for providing an indication of a probability that a member of a social networking service will respond to an electronic communication sent via the social networking service, the method comprising:
   retrieving a plurality of sample member profiles of members of the social networking service, a plurality of sample member labels, and activity and usage information pertaining to actions taken by those members on the social networking service;
   for each sample member profile:
      parsing the sample member profile to extract a first set of one or more features from the sample member profile and parsing the activity and usage information pertaining to actions taken by those members on the social networking service to extract a second set of one or more features;
      feeding the sample member labels, extracted first set of features and second set of features into a supervised machine learning algorithm to train a communication reply score model based on the extracted first set of features and the second set of features;
   obtaining a plurality of member search results produced by actions performed in a user interface, each member search result identifying a member of the social networking service;
   for the member identified in each of the plurality of member search results:
      parsing a member profile corresponding to the member to extract a third set of one or more features from the member profile and parsing activity and usage information pertaining to actions taken by the members on the social networking service to extract a fourth set of one or more features;
      inputting the extracted third set of features and fourth set of features into the communication reply score model to generate a communication reply score reflecting a probability that the member will respond to an email communication from a searcher; and
   presenting the member search results visually in the user interface, with each member search result being presented with a visual indication of the corresponding member's communication reply score.

2. The method of claim 1, wherein the third set of features is identical to the first set of features and the fourth set of features is identical to the second set of features.

3. The method of claim 1, wherein the obtaining the plurality of member search results includes obtaining an ordering of the plurality of member search results, the ordering based on a ranking of each member search result based on a search algorithm; and
   wherein the presenting the member search results causes the member search results to be displayed visually in an order reflecting the ordering, regardless of the communication reply scores of the corresponding members.

4. The method of claim 1, further comprising:
receiving a selection of one or more members from the user interface as favorites; and
for each of the one or more members selected as favorites, periodically repeating the parsing and inputting for the corresponding member and notifying the searcher if a communication reply score for the corresponding member changes significantly.

5. The method of claim 1, further comprising:
grouping each member communication reply score into a category based on its relationship to an average communication reply score among a plurality of members; and
wherein the visual indication includes a visual indication of the corresponding grouping for the member communication reply score for the corresponding member.

6. The method of claim 1, further comprising:
retrieving a plurality of sample searcher member profiles of members of the social networking service, and activity and usage information pertaining to actions taken by those searchers on the social networking service;
for each sample searcher member profile:
  parsing the sample searcher member profile to extract a fifth set of one or more features from the sample searcher member profile and parsing the activity and usage information pertaining to actions taken by those searchers on the social networking service to extract a sixth set of one or more features; and
  feeding the extracted fifth set of features and sixth set of features into the supervised machine learning algorithm to train the communication reply score model based on the extracted fifth set of features and the sixth set of features.

7. The method of claim 6, further comprising:
obtaining an identification of the searcher from the user interface;
parsing a member profile corresponding to the searcher to extract a seventh set of one or more features from the member profile and parsing activity and usage information pertaining to actions taken by the searcher on the social networking service to extract an eighth set of one or more features; and
inputting the extracted seventh set of features and eight set of features into the communication reply score model to generate the communication reply score reflecting a probability that the member will respond to an email communication from the searcher.

8. A system comprising:
a non-transitory computer readable medium having instructions stored there on, which, when executed by a processor, cause the system to:
retrieve a plurality of sample member profiles of members of a social networking service, a plurality of sample member labels, and activity and usage information pertaining to actions taken by those members on the social networking service;
for each sample member profile:
  parse the sample member profile to extract a first set of one or more features from the sample member profile and parsing the activity and usage information pertaining to actions taken by those members on the social networking service to extract a second set of one or more features;
  feed the sample member labels, extracted first set of features and second set of features into a supervised machine learning algorithm to train a communication reply score model based on the extracted first set of features and the second set of features;
obtain a plurality of member search results produced by actions performed in a user interface, each member search result identifying a member of the social networking service;
for the member identified in each of the plurality of member search results:
  parse a member profile corresponding to the member to extract a third set of one or more features from the member profile and parsing activity and usage information pertaining to actions taken by the members on the social networking service to extract a fourth set of one or more features;
  input the extracted third set of features and fourth set of features into the communication reply score model to generate a communication reply score reflecting a probability that the member will respond to an email communication from a searcher; and
  present the member search results visually in the user interface, with each member search result being presented with a visual indication of the corresponding member's communication reply score.

9. The system of claim 8, wherein the third set of features is identical to the first set of features and the fourth set of features is identical to the second set of features.

10. The system of claim 8, wherein the obtaining the plurality of member search results includes obtaining an ordering of the plurality of member search results, the ordering based on a ranking of each member search result based on a search algorithm; and
wherein the presenting the member search results causes the member search results to be displayed visually in an order reflecting the ordering, regardless of the communication reply scores of the corresponding members.

11. The system of claim 8, wherein the computer readable medium further has instructions stored there on, which, when executed by a processor, cause the system to:
receive a selection of one or more members from the user interface as favorites; and
for each of the one or more members selected as favorites, periodically repeat the parsing and inputting for the corresponding member and notifying the searcher if a communication reply score for the corresponding member changes significantly.

12. The system of claim 8, wherein the computer readable medium further has instructions stored there on, which, when executed by a processor, cause the system to:
group each member communication reply score into a category based on its relationship to an average communication reply score among a plurality of members; and
wherein the visual indication includes a visual indication of the corresponding grouping for the member communication reply score for the corresponding member.

13. The system of claim 8, wherein the computer readable medium further has instructions stored there on, which, when executed by a processor, cause the system to:
retrieve a plurality of sample searcher member profiles of members of the social networking service, and activity and usage information pertaining to actions taken by those searchers on the social networking service;
for each sample searcher member profile:
  parse the sample searcher member profile to extract a fifth set of one or more features from the sample searcher member profile and parsing the activity and usage information pertaining to actions taken by those searchers on the social networking service to extract a sixth set of one or more features; and feed the extracted fifth set of features and sixth set of features into the supervised machine learning algorithm to train the communication reply score model based on the extracted fifth set of features and the sixth set of features.

14. The system of claim 13, further comprising:

obtain an identification of the searcher from the user interface;

parse a member profile corresponding to the searcher to extract a seventh set of one or more features from the member profile and parsing activity and usage information pertaining to actions taken by the searcher on the social networking service to extract an eighth set of one or more features; and input the extracted seventh set of features and eight set of features into the communication reply score model to generate the communication reply score reflecting a probability that the member will respond to an email communication from the searcher.

15. A non-transitory machine-readable storage medium comprising instructions, which when implemented by one or more machines, cause the one or more machines to perform operations comprising:

retrieving a plurality of sample member profiles of members of a social networking service, a plurality of sample member labels, and activity and usage information pertaining to actions taken by those members on the social networking service;

for each sample member profile:

parsing the sample member profile to extract a first set of one or more features from the sample member profile and parsing the activity and usage information pertaining to actions taken by those members on the social networking service to extract a second set of one or more features;

feeding the sample member labels, extracted first set of features and second set of features into a supervised machine learning algorithm to train a communication reply score model based on the extracted first set of features and the second set of features;

obtaining a plurality of member search results produced by actions performed in a user interface, each member search result identifying a member of the social networking service;

for the member identified in each of the plurality of member search results:

parsing a member profile corresponding to the member to extract a third set of one or more features from the member profile and parsing activity and usage information pertaining to actions taken by the members on the social networking service to extract a fourth set of one or more features;

inputting the extracted third set of features and fourth set of features into the communication reply score model to generate a communication reply score reflecting a probability that the member will respond to an email communication from a searcher; and presenting the member search results visually in the user interface, with each member search result being presented with a visual indication of the corresponding member's communication reply score.

16. The non-transitory machine-readable storage medium of claim 15, wherein the third set of features is identical to the first set of features and the fourth set of features is identical to the second set of features.

17. The non-transitory machine-readable storage medium of claim 15, wherein the obtaining the plurality of member search results includes obtaining an ordering of the plurality of member search results, the ordering based on a ranking of each member search result based on a search algorithm; and wherein the presenting the member search results causes the member search results to be displayed visually in an order reflecting the ordering, regardless of the communication reply scores of the corresponding members.

18. The non-transitory machine-readable storage medium of claim 15, further comprising:

receiving a selection of one or more members from the user interface as favorites; and for each of the one or more members selected as favorites, periodically repeating the parsing and inputting for the corresponding member and notifying the searcher if a communication reply score for the corresponding member changes significantly.

19. The non-transitory machine-readable storage medium of claim 15, further comprising:

grouping each member communication reply score into a category based on its relationship to an average communication reply score among a plurality of members; and wherein the visual indication includes a visual indication of the corresponding grouping for the member communication reply score for the corresponding member.

20. The non-transitory machine-readable storage medium of claim 15, further comprising:

retrieving a plurality of sample searcher member profiles of members of the social networking service, and activity and usage information pertaining to actions taken by those searchers on the social networking service;

for each sample searcher member profile:

parsing the sample searcher member profile to extract a fifth set of one or more features from the sample searcher member profile and parsing the activity and usage information pertaining to actions taken by those searchers on the social networking service to extract a sixth set of one or more features; and feeding the extracted fifth set of features and sixth set of features into the supervised machine learning algorithm to train the communication reply score model based on the extracted fifth set of features and the sixth set of features.

* * * * *